Jan. 30, 1940. C. V. BERGLUND 2,188,452
BRAKE
Filed July 5, 1938

INVENTOR.
CHARLES V. BERGLUND
BY C. H. Fowler
ATTORNEY.

Patented Jan. 30, 1940

2,188,452

UNITED STATES PATENT OFFICE 2,188,452

BRAKE

Charles V. Berglund, Detroit, Mich., assignor to Hydraulic Brake Company, Detroit, Mich., a corporation of California Application July 5, 1938, Serial No. 217,595

4 Claims. (Cl. 188—79.5)

This invention relates to brakes, and more particularly to means for adjusting the friction elements thereof.

An object of the invention is to provide means for automatically adjusting the friction elements of a brake.

Another object of the invention is to provide means for automatically adjusting the friction elements of a brake so as to compensate for wear of the linings on the friction elements.

Yet another object of the invention is to provide means for automatically adjusting the friction elements of a brake and means for locking the adjusting means against retrograde movement.

A further object of the invention is to provide means for automatically adjusting the friction elements of a brake controlled by wear on the lining of the friction element during a normal operation of the brake and by means for inhibiting retrograde movement of the adjusting means.

Other objects of the invention will appear from the following description taken in connection with the drawing forming a part of this specification, and in which—

Figures 1, 2, 3:
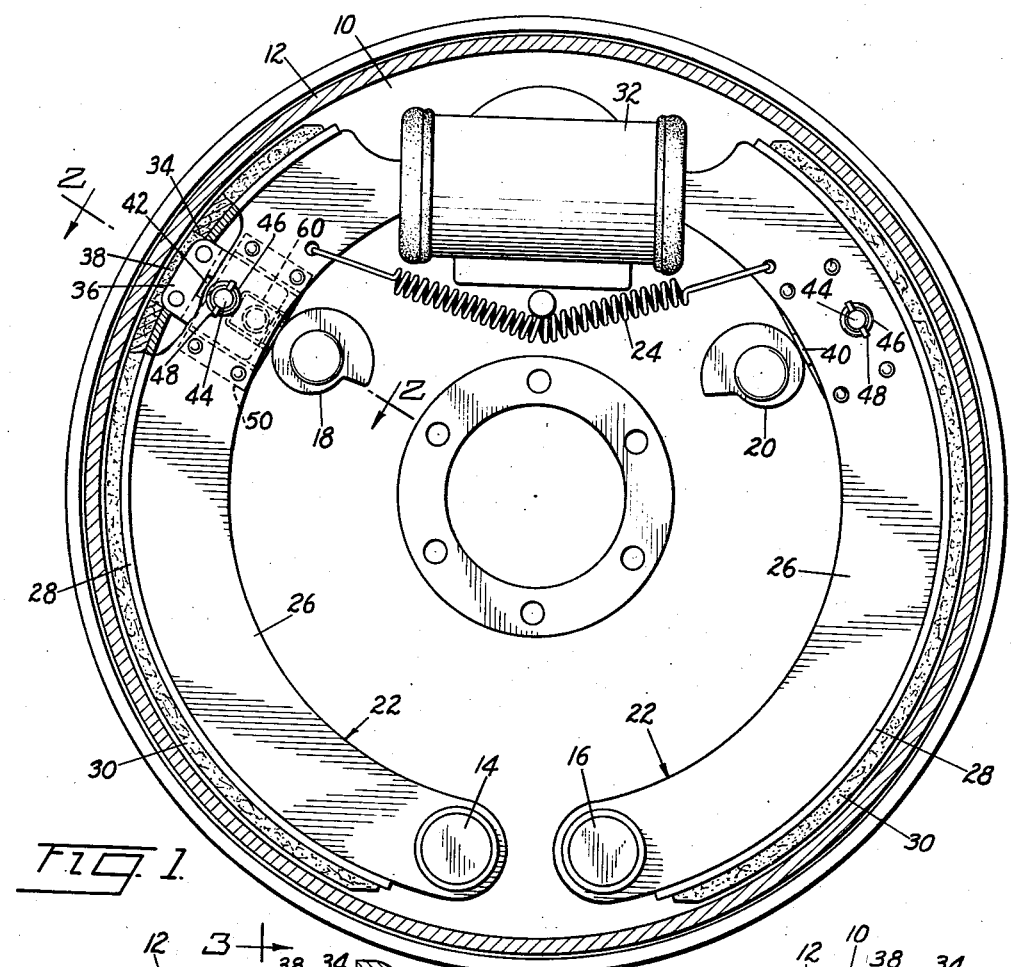
Fig. 1 is a vertical sectional view of a motor vehicle brake embodying the invention.
Fig. 2 is a sectional view substantially on line 2—2, Fig. 1.
Fig. 3 is a sectional view substantially on line 3—3, Fig. 2.

Referring to the drawing, 10 represents a fixed support or backing plate adapted to be secured to an axle or to an axle housing, and 12 a rotatable drum associated with the backing plate adapted to be secured to a wheel. The backing plate has arranged thereon spaced anchors 14 and 16, and adjustable retractile stops 18 and 20. A pair of corresponding interchangeable friction elements or shoes 22 pivotally mounted on the anchors 14 and 16 are normally supported in proper spaced relation to the drum by the stops 18 and 20, and a retractile spring 24 having its respective ends connected to the shoes serves to return the shoes to the stops at the conclusion of a braking operation, and also to retain the shoes on the stop when the brake is at rest.

The shoes are of conventional type, each including a web 26 supporting a rim 28 having suitably secured thereto a frictional lining 30 for cooperation with the drum. A fluid pressure actuated motor 32 mounted on the backing plate 10 between the force applying ends of the shoes 22 and connected, as in practice, to a fluid pressure producing device, is operative to actuate the shoes into engagement with the drum against the resistance of the retractile spring 24.

Each shoe 22 has arranged therein adjacent its force applying end an opening 34 extended through the rim 28 and the lining 30. A movable plate 36 supports a frictional block 38 of low coefficient of friction in the opening with the face of the block coextensive with the face of the lining 30. The plate 36 is frictionally clamped to one side of the web 26 of the shoe, and this plate has a part 40 bent normal to its body portion for cooperation with the adjustable retractile stop.

As shown, the plate 36 has a longitudinal slot 42 for the reception of a bolt 44, movably mounted in an opening in the web of the shoe. The head of the bolt straddles the slot 42 and bears against the plate, and sleeved on the bolt on the other side of the web 26 is a heavy spring 46 held under compression between the web and a pin 48 extended diametrically through the bolt.

A housing 50 suitably mounted on the web 26 of the shoe straddles the plate 36. The housing includes corresponding parallel side walls 52 and a top 54 having an opening 56 therein and a portion 58 inclined with relation to the web 26. A shell 60 slidable in the housing constitutes a wedge between the part 40 of the plate 36 and the inclined portion 58 of the housing 50, and a light spring 62 interposed between the shell and the plate 36 urges the shell into wedging engagement with the part 40 of the plate and the inclined portion 58 of the housing.

In a normal operation, energization of the motor 32 results in actuation of the shoes 22 into engagement with the drum 12 against the resistance of the retractile spring 24. When the shoes engage the drum, friction created between the linings 30 on the shoes and the drums causes wear of the linings. This results in unsatisfactory adjustment of the shoes with relation to the drum when the shoes are returned by the spring 24 to the retractile stops 18 and 20, at the end of a braking operation. Because of the wear on the linings 30, greater movement of the shoes is necessary during a subsequent operation of the brake.

The present invention aims to avoid maladjustment of the brake by providing an automatic adjuster for each of the shoes frictionally clamped to the web of the shoe and movable relative thereto, the adjuster having a wear-resisting lining for engaging the drum, a part cooperating with the retractile stop, and means inhibiting retrograde movement of the adjuster due to tension on the retractile spring.

In the operation of the brake equipped with adjusters of this particular structure, upon actuation of the shoes the linings 30 on the shoes frictionally engage the drums and simultaneously with this operation the wear-resisting lining 38 on the plate 36 engages the drum. Because of a differential in the coefficient of friction between the linings 30 and the linings 38, the plates 36 supporting the wear-resisting lining 38 are moved relative to the shoes proportionately to the wear on the linings 30, and, as the plates 38 move, the spring-pressed wedges 60 cooperate with the parts 40 of the plates and the inclined walls 58 of the housings 50 to inhibit retrograde movement of the plates. Under this condition, upon concluding a braking operation and return of the shoes to the retractile stops under the influence of the retractile spring, the shoes are supported in proper spaced relation to the drum for a subsequent operation, and the adjustment of the shoes is in no way impaired, due to the tension on the retractile spring.

While this invention has been described in connection with certain specific embodiments, the principle involved is susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is—

1. A brake comprising a movable member, a friction element for cooperation with the movable member, a retractile stop for the friction element, a slidable member frictionally clamped to the friction element for cooperation with the movable member and the stop, and a spring-pressed member engaging and retaining the slidable member against retrograde movement.

2. A brake comprising a movable member, a friction element for cooperation therewith, a retractile stop for the element, a slidable member frictionally clamped to the element adapted for cooperation with the stop, a wear-resisting lining on the slidable member adapted for cooperation with the movable member, and a spring-pressed member for retaining the slidable member against retrograde movement.

3. A brake comprising a movable member, a friction element having a lining for cooperation with the movable member, a retractile stop for the element, a slidable member frictionally clamped to the element adapted for cooperation with the stop, a wear-resisting lining on the slidable member for cooperation with the movable member, a housing for the slidable member, and a spring-pressed member between the housing and the slidable member for inhibiting retrograde movement of the slidable member.

4. A brake comprising a fixed support, a rotatable drum associated therewith, a friction element on the fixed support having a lining for cooperation with the drum, a retractile stop for the friction element, a slidable member frictionally clamped to the friction element for cooperation with the stop, a wear-resisting lining on the slidable member for cooperation with the drum, a housing for the slidable member, and a spring-pressed wedging member between the slidable member and the housing.

CHARLES V. BERGLUND.